United States Patent
O'Kane et al.

(10) Patent No.: US 9,555,694 B2
(45) Date of Patent: Jan. 31, 2017

(54) VEHICLE DOOR ASSEMBLY

(75) Inventors: James C. O'Kane, Shelby Township, MI (US); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 783 days.

(21) Appl. No.: 13/296,572

(22) Filed: Nov. 15, 2011

(65) Prior Publication Data

US 2013/0118090 A1 May 16, 2013

(51) Int. Cl.
*B60J 5/04* (2006.01)

(52) U.S. Cl.
CPC .................. *B60J 5/0412* (2013.01)

(58) Field of Classification Search
USPC ................ 49/502; 296/146.5, 146.1, 191
See application file for complete search history.

(56) References Cited

U.S. PATENT DOCUMENTS

| | | | | | |
|---|---|---|---|---|---|
| 4,328,642 | A | * | 5/1982 | Presto | 49/502 |
| 4,416,088 | A | * | 11/1983 | Feucht et al. | 49/502 |
| 4,845,894 | A | * | 7/1989 | Herringshaw et al. | 49/502 |
| 5,127,191 | A | * | 7/1992 | Ohta | 49/62 |
| 5,226,259 | A | * | 7/1993 | Yamagata et al. | 49/502 |
| 6,101,765 | A | * | 8/2000 | Hashimoto et al. | 49/502 |
| 6,381,906 | B1 | * | 5/2002 | Pacella et al. | 49/502 |
| 7,401,847 | B2 | * | 7/2008 | Kidachi et al. | 296/187.12 |
| 7,607,716 | B2 | * | 10/2009 | Buchta et al. | 296/146.6 |
| 2007/0116534 | A1 | * | 5/2007 | Pocobello et al. | 410/1 |

* cited by examiner

*Primary Examiner* — Katherine Mitchell
*Assistant Examiner* — Shiref Mekhaeil

(57) ABSTRACT

A vehicle door may include a door outer panel defining an exterior surface of the vehicle door; a common door inner panel located inboard of the door outer panel and configured to mount door hardware, with the common door inner panel having a periphery; and a panel extension extending around essentially all of the periphery of the common door inner panel, the panel extension being attached to the periphery of the common door inner panel and attached to the door outer panel to secure the common door inner panel to the door outer panel.

5 Claims, 3 Drawing Sheets

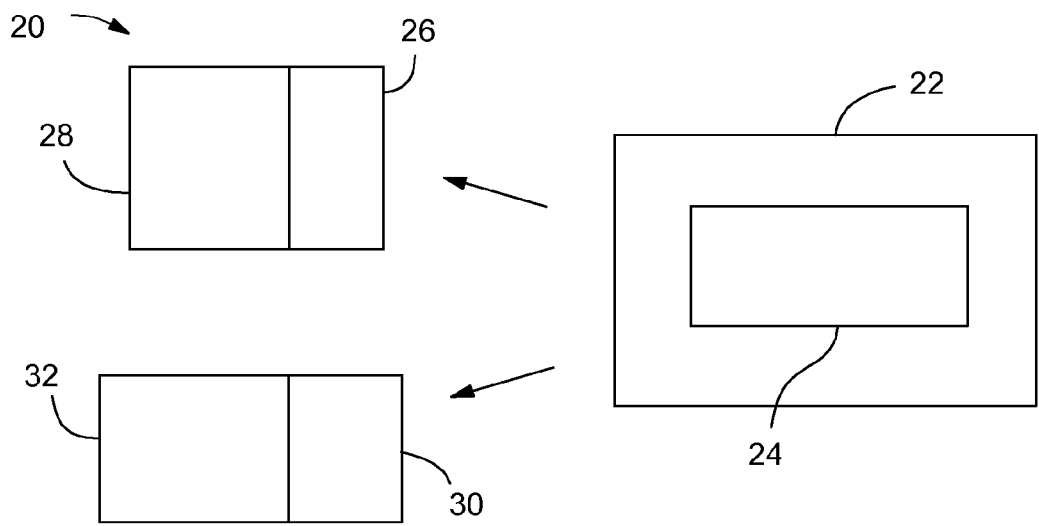
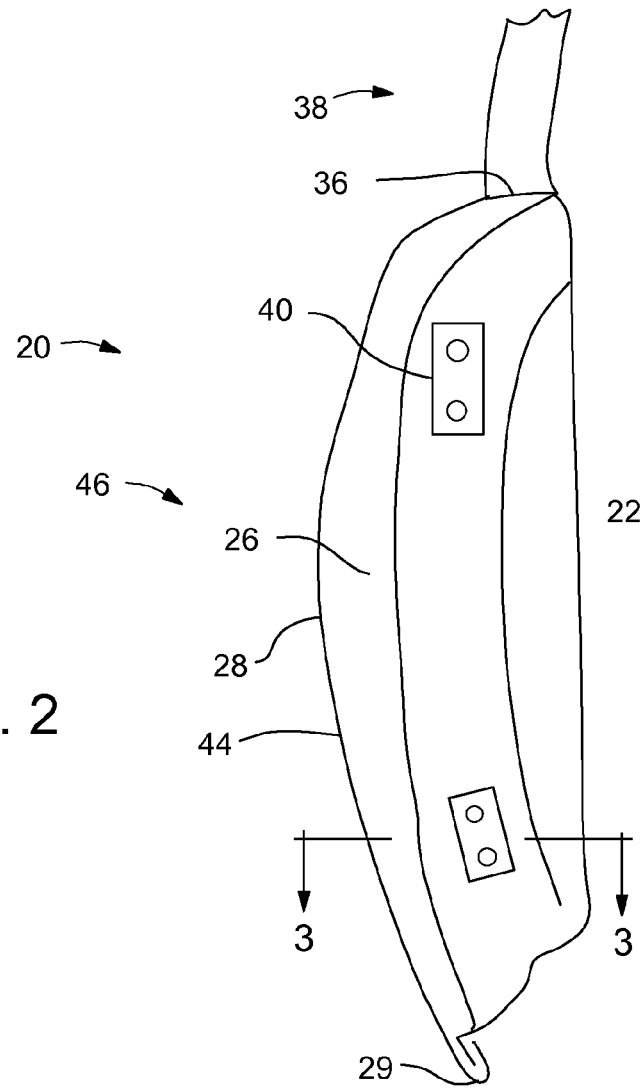
Fig. 1
Fig. 2

VEHICLE DOOR ASSEMBLY

BACKGROUND OF INVENTION

The present invention relates generally to door structure for a vehicle door and more particularly to a common door inner panel that is employed with various styles of door outer panels in a vehicle door.

Vehicle exterior styling plays a significant part in people's decisions to purchase certain automotive vehicles. Thus, a particular vehicle manufacturer may have various styles of doors, to match different styles of vehicles, even for similar size doors on similar sized vehicles. Moreover, the exterior styling for a vehicle may change from time to time to increase the appeal of particular vehicles. With current vehicle door construction methodology, a change in the shape or dimensions of a door outer panel necessitates a change in the door inner panel to accommodate the door outer panel changes. Thus, the cost and time required for changing a door style is significant. Also, for vehicles with similar sized doors, but of different style, the door inner panel is different for each of these different styled doors. These different door inner panels may also require differences to accommodate mounting the door hardware.

SUMMARY OF INVENTION

An embodiment contemplates a vehicle door. The vehicle door may include a door outer panel defining an exterior surface of the vehicle door; a common door inner panel located inboard of the door outer panel and configured to mount door hardware, with the common door inner panel having a periphery; and a panel extension extending around essentially all of the periphery of the common door inner panel, with the panel extension being attached to the periphery of the common door inner panel and attached to the door outer panel to secure the common door inner panel to the door outer panel.

An embodiment contemplates a method of assembling a vehicle door comprising the steps of: forming a panel extension separate from a common door inner panel and a door outer panel; attaching the panel extension to the door outer panel; mounting door hardware to the common door inner panel; and attaching the panel extension to a periphery of the common door inner panel.

An embodiment contemplates a vehicle door. The vehicle door may include one of a first door outer panel and a second door outer panel defining an exterior surface of the vehicle door; a common door inner panel located inboard of one of the first and second door outer panels and configured to mount door hardware, the common door inner panel having a periphery; and one of a first panel extension, configured to mate with the corresponding first door outer panel, and a second panel extension, configured to mate with the corresponding second door outer panel, extending around essentially all of the periphery of the common door inner panel, the one of the first and second panel extensions being attached to the periphery of the common door inner panel and attached to the corresponding one of the first and second door outer panels to secure the common door inner panel to the corresponding door outer panel.

An advantage of an embodiment is that a common inner door panel can be mated to different door outer panels within a similar door size range by employing suitable extension panels. This commonality reduces the cost by allowing for a generic door inner panel that meets the vehicle structural requirements and can mount door hardware that is common to similar sized (but different shaped) door outer panels. This allows for different exterior styling on various vehicles without requiring a different door inner panel. Having common door hardware for different styles of doors may also reduce the cost of producing the various styles of doors. Another advantage is that exterior restyling of a particular model of vehicle can be achieved while minimizing the cost and lead time by maintaining the same door inner panel and door mounted hardware. This may make styling differences cost effective for lower volume vehicle styles.

BRIEF DESCRIPTION OF DRAWINGS

FIG. 1 is a schematic diagram showing a common door inner panel and common hardware that can be mounted to different panel extensions and corresponding door outer panels.

FIG. 2 is a schematic end view of a vehicle door.

DETAILED DESCRIPTION

Figure 3:
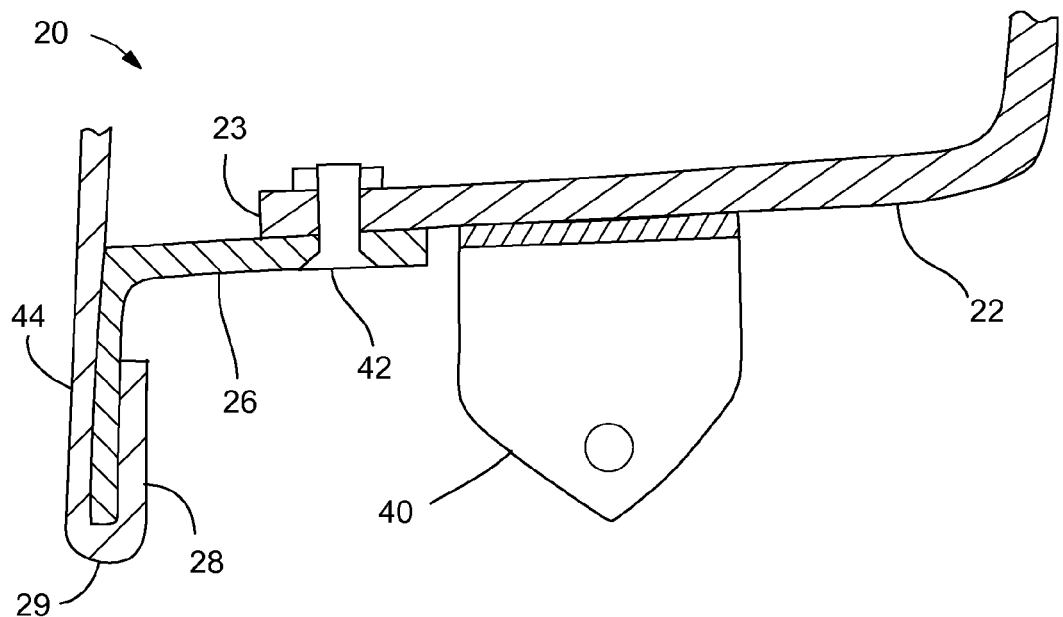
FIG. 3 is a schematic, sectional view, on an enlarged scale, taken along line 3-3 in FIG. 2.

Referring to FIG. 1, a vehicle door, or portion thereof, indicated generally at 20, is shown. The vehicle door 20 includes a common door inner panel 22 to which door hardware 24 is mounted. The door hardware 24 may be conventional and may include, for example, door sealing systems, outside door handles attached to a latch via cable, window regulators, door latches, check links (the above not shown) and door hinges. The common door inner panel 22 mounts the door hardware, so the door hardware and its mounting locations may be common for the different styles of door outer panels.

The common door inner panel 22 is configured to be able to mount, around its periphery 23, to different panel extensions and different styles of door outer panels without requiring any change to the common door inner panel 22 and most or all of the door hardware. For example the door inner panel 22 may mount to a first panel extension 26, which in turn, mounts to a first door outer panel 28; or it may mount to a second panel extension 30, which, in turn, mounts to a second door outer panel 32, with the first panel extension 26 having a different shape than the second panel extension 30 and the first door outer panel 28 having a different shape than the second door outer panel 32. The panel extensions 28, 30 are changed to allow the differences in corresponding door outer panel shape while not changing the door inner panel 22 (i.e., a common door inner panel).

When referring to a panel extension herein, this means door structure, which is a panel that extends around all or around essentially all of a periphery of a lower portion of the vehicle door 20 and is formed separately from the door inner panel and separately from the door outer panel to which it is later attached. Panel extension does not include any portion of the door inner panel 22 that is formed with the inner panel 22, or any portion of the door outer panel 28 or 32 that is formed with the door outer panel 28 or 32, i.e., it is not formed with either panel as a single, monolithic piece. A door outer panel is a structural door panel that forms the outer surface of the vehicle door, and a door inner panel is a structural door panel that does not form the outer surface of the door—it is mounted inboard of the door outer panel. Inboard means that it is closer to the center (inside) of the vehicle relative to something that is outboard.

The panel extension 26 may be attached to the door inner panel 22 and the door outer panel 28 using various attachment techniques. For example, the door panel extension 26 may be attached by being hemmed to one of the other panels, also fasteners can be employed, such as rivets, press fit fasteners, threaded fasteners or other types of fasteners. The panel extension 26 may also be attached to the other panels using adhesive, either by itself or in addition to one of the other attachment techniques, or welding, if so desired.

FIGS. 2 and 3 illustrate the vehicle door 20 having the common door inner panel 22, panel extension 26 and door outer panel 28. These panels, as discussed herein, are addressing a lower portion 46 of the door 20 below the door's belt line 36. Above the belt line 36 is a window opening in the upper portion 38 of the door 20. The door outer panel 28 forms a portion of the vehicle's exterior surface 44, which is why the door outer panel 28 is likely to change between different models of vehicles or when a particular model of vehicle receives an update. The term exterior surface, when used herein relative to the vehicle door, means the surface that can be seen by one located outside of the vehicle when the vehicle door is closed.

Door hinges 40 may be mounted to the door inner panel 22, which may allow the door hinges 40 to remain the same for different styles of door outer panels 28. In this particular configuration, the panel extension 26 is hemmed to the door outer panel 28, around the door outer panel periphery 29, and is attached with fasteners 42 to the door inner panel 22, around its periphery 23.

Figure 4:
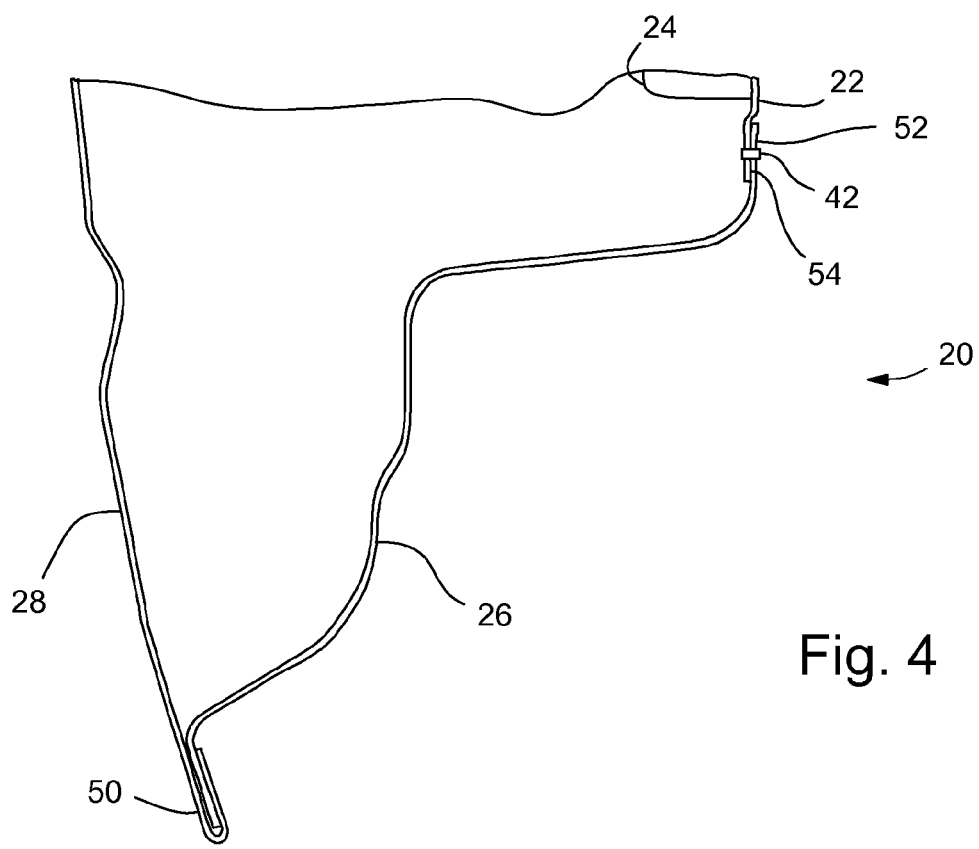
FIG. 4 is another schematic, sectional view of a portion of a vehicle door.

FIG. 4 shows a schematic cross section of portions of the vehicle door 20. The door outer panel 28 is hemmed to the panel extension 26 to form an outer panel-extension joint 50. The common door inner panel 22 is attached to the panel extension 26 with fasteners 42, such as rivets, to form an inner panel-extension joint 52. Adhesive 54 may be applied to one or both joints 50, 52 to strengthen the joints. Door hardware 24 is mounted to the door inner panel 22.

Figure 5:
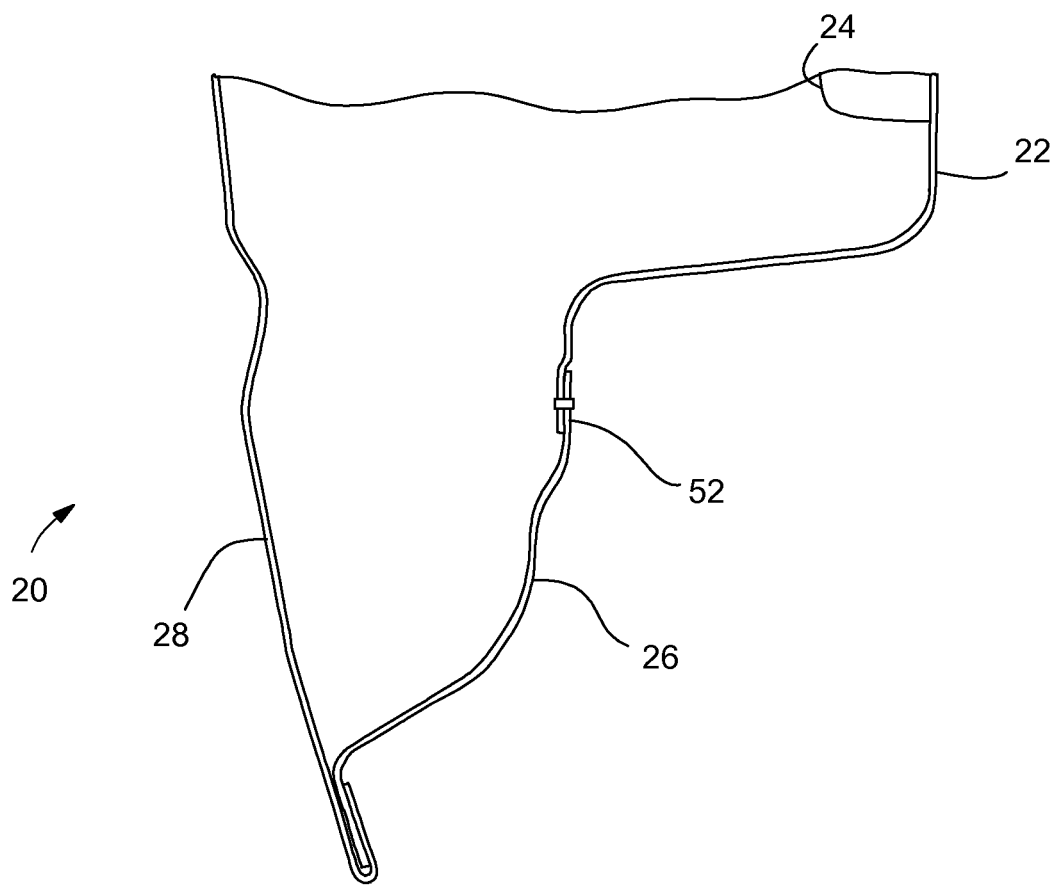
FIG. 5 is a view similar to FIG. 4, showing an alternate location of the joint between the door inner panel and the panel extension.

FIG. 5 shows a portion of a vehicle door 20 similar to FIG. 4, but with the inner panel-extension joint 52, connecting the door inner panel 22 to the panel extension 26, located differently on this particular door configuration. The door outer panel 28 and the door hardware 24 may be the same as in FIG. 4.

While certain embodiments of the present invention have been described in detail, those familiar with the art to which this invention relates will recognize various alternative designs and embodiments for practicing the invention as defined by the following claims.

What is claimed is:

1. A vehicle door comprising:
   a door outer panel defining an exterior surface of the vehicle door;
   a common door inner panel located inboard of the door outer panel and configured to mount door hardware, the common door inner panel having a periphery; and
   a panel extension extending around essentially all of the periphery of the common door inner panel, the panel extension being permanently attached directly to the periphery of the common door inner panel, forming an inner panel-extension joint, and the panel extension permanently attached directly to the door outer panel, forming an outer panel-extension joint, to secure the common door inner panel to the door outer panel via the panel extension.

2. The vehicle door of claim 1 wherein the outer panel-extension joint is a hemmed joint.

3. The vehicle door of claim 1 wherein the inner panel-extension joint includes fasteners securing the panel extension to the common door inner panel.

4. The vehicle door of claim 1 including at least one hinge that is directly mounted to the common door inner panel.

5. A vehicle door comprising:
   one of a first door outer panel and a second door outer panel defining an exterior surface of the vehicle door, the first door outer panel having a different shape than the second door outer panel;
   a common door inner panel located inboard of one of the first and second door outer panels and configured to mount door hardware, the common door inner panel having a periphery; and
   one of a first panel extension, configured to mate with the corresponding first door outer panel, and a second panel extension, configured to mate with the corresponding second door outer panel, the first panel extension having a different shape than the second panel extension, the one of the first panel extension and the second panel extension extending around essentially all of the periphery of the common door inner panel, the one of the first and second panel extensions being permanently attached directly to the periphery of the common door inner panel and permanently attached directly to the corresponding one of the first and second door outer panels to secure the common door inner panel to the corresponding door outer panel via the one of the first and second panel extensions.

* * * * *